(12) United States Patent
Yamauchi et al.

(10) Patent No.: US 10,359,161 B2
(45) Date of Patent: Jul. 23, 2019

(54) LIGHT ENVIRONMENT RENDERING SYSTEM, LIGHTING APPARATUS, LIGHT ENVIRONMENT RENDERING METHOD, AND STORAGE MEDIUM

(71) Applicant: Panasonic Intellectual Property Management Co., Ltd., Osaka (JP)

(72) Inventors: Kentaro Yamauchi, Hyogo (JP); Hironori Takeshita, Osaka (JP); Satoshi Hyodo, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/936,143

(22) Filed: Mar. 26, 2018

(65) Prior Publication Data

US 2018/0283627 A1 Oct. 4, 2018

(30) Foreign Application Priority Data

Mar. 29, 2017 (JP) ................. 2017-066403

(51) Int. Cl.
*F21V 7/00* (2006.01)
*F21S 8/00* (2006.01)
(Continued)

(52) U.S. Cl.
CPC .............. *F21S 8/006* (2013.01); *F21V 3/049* (2013.01); *F21V 7/0008* (2013.01); *F21V 7/05* (2013.01);
(Continued)

(58) Field of Classification Search
CPC .......... F21V 15/01; F21V 3/02; F21V 23/003; F21V 13/02; F21V 7/00; F21V 7/008; F21V 7/05; F21V 3/049; F21Y 2105/00; F21Y 2115/10; F21Y 2103/10; F21Y 2113/13; H05B 33/08; H05B 33/086;
(Continued)

(56) References Cited

U.S. PATENT DOCUMENTS

2013/0100174 A1* 4/2013 Yamada ................ G06F 3/1431
345/690
2017/0051893 A1 2/2017 Di Trapani
(Continued)

FOREIGN PATENT DOCUMENTS

JP 2001-176679 A 6/2001
JP 2015-207554 A 11/2015

*Primary Examiner* — Thai Pham
(74) *Attorney, Agent, or Firm* — McDermott Will & Emery LLP

(57) ABSTRACT

A light environment rendering system includes: one lighting apparatus disposed on a part of a structure to form an illumination space; another lighting apparatus disposed on the part of a structure, at a position different from a position at which the one lighting apparatus is located, to form the illumination space; and a system controller which controls an operation of each of the lighting apparatuses. The system controller determines an illumination mode based on sky information that indicates at least one of a brightness and a color tone of a sky which are determined at least based on an azimuth direction and a height of the sun, and causes each of the lighting apparatuses to perform lighting simulating a sky according to the illumination mode.

17 Claims, 7 Drawing Sheets

(51) Int. Cl.
   *H05B 37/02*   (2006.01)
   *H05B 33/08*   (2006.01)
   *F21V 13/02*   (2006.01)
   *F21V 3/04*    (2018.01)
   *F21V 7/05*    (2006.01)
   *F21V 23/00*   (2015.01)
   *F21Y 105/00*  (2016.01)
   *F21Y 103/10*  (2016.01)
   *F21Y 115/10*  (2016.01)
   *F21Y 113/13*  (2016.01)

(52) U.S. Cl.
   CPC ............ *F21V 13/02* (2013.01); *F21V 23/003* (2013.01); *H05B 33/086* (2013.01); *H05B 37/0218* (2013.01); *H05B 37/0227* (2013.01); *F21Y 2103/10* (2016.08); *F21Y 2105/00* (2013.01); *F21Y 2113/13* (2016.08); *F21Y 2115/10* (2016.08)

(58) Field of Classification Search
   CPC ................ H05B 33/0857; H05B 37/02; H05B 37/0272; H05B 37/0227; H05B 37/0281
   See application file for complete search history.

(56) References Cited

U.S. PATENT DOCUMENTS

| | | | |
|---|---|---|---|
| 2017/0374726 A1* | 12/2017 | Sato | H04W 4/02 |
| 2018/0017233 A1* | 1/2018 | Takeshita | H05B 33/0857 |
| 2018/0084924 A1* | 3/2018 | Sun | A47F 3/001 |
| 2018/0147386 A1* | 5/2018 | Sato | A61M 21/02 |
| 2018/0279454 A1* | 9/2018 | Takeshita | G02B 6/0051 |

* cited by examiner

LIGHT ENVIRONMENT RENDERING SYSTEM, LIGHTING APPARATUS, LIGHT ENVIRONMENT RENDERING METHOD, AND STORAGE MEDIUM

CROSS REFERENCE TO RELATED APPLICATION

This application claims the benefit of priority of Japanese Patent Application Number 2017-066403 filed on Mar. 29, 2017, the entire content of which is hereby incorporated by reference.

BACKGROUND

1. Technical Field

The present disclosure relates to a light environment rendering system, a light environment rendering method, and a storage medium. In particular, the present disclosure relates to a light environment rendering system, a light environment rendering method, and a storage medium, which cause a user to simulatively feel outdoor light in, for example, a meeting room without a window, an underground mall, a tunnel, etc.

2. Description of the Related Art

For example, in an environment without outdoor light, such as a meeting room without a window, an underground mall, a tunnel, etc., a person feels pressure and stress in some cases. In view of the above, an artificial window is provided to a wall surface of such places, and artificial outdoor light is emitted through the window, thereby making it possible to give the places an open feeling so as to alleviate the pressure and stress.

For example, Japanese Unexamined Patent Application Publication No. 2015-207554 discloses a lighting system (an example of a first lighting apparatus or a second lighting apparatus) which includes a light source and a diffusion light generator (an example of a diffuser plate) that generates diffusion light.

In addition, for example, Japanese Unexamined Patent Application Publication No. 2001-176679 discloses an artificial window device (an example of a light environment rendering system) which includes an artificial window unit (an example of a first lighting apparatus) installed on a wall surface facing the south and an artificial window unit (an example of a second lighting apparatus) installed on a wall surface facing the west.

SUMMARY

However, with the conventional lighting systems, unless the light source provided on an upper side of a ceiling of the diffusion light generator is sufficiently spaced apart from the diffusion light generator, a blue sky becomes planer and the sun looks like being present in the close vicinity of the diffusion light generator, and thus it is not possible to reproduce an artificial sky. For that reason, the light source needs to be spaced far apart from the diffusion light generator in order to reproduce an artificial sky using the lighting system, resulting in an increase in size of the lighting system.

In view of the above, an object of the present disclosure is to provide a light environment rendering system, a lighting apparatus, a light environment rendering method, and a storage medium, which are capable of reproducing an artificial sky while suppressing an increase in size.

In order to achieve the above-described object, an aspect of a light environment rendering system according to the present disclosure includes: a first lighting apparatus disposed on a part of a structure to form an illumination space; a second lighting apparatus disposed on the part of a structure to form the illumination space, the second lighting apparatus being located at a position different from a position at which the first lighting apparatus is located; and a controller which controls an operation of the first lighting apparatus and an operation of the second lighting apparatus. In the light environment rendering system, the controller determines an illumination mode based on sky information that indicates at least one of a brightness and a color tone of a sky which are determined at least based on an azimuth direction and a height of the sun, and causes the first lighting apparatus and the second lighting apparatus to perform lighting simulating a sky according to the illumination mode.

In addition, in order to achieve the above-described object, an aspect of a light environment rendering method according to the present disclosure is a light environment rendering method which is used in a system including a first lighting apparatus disposed on a part of a structure to form an illumination space and a second lighting apparatus disposed on the part of a structure to form the illumination space, the second lighting apparatus being located at a position different from a position at which the first lighting apparatus is located. The light environment rendering method includes: transmitting, by a terminal device, sky information to a controller, the sky information indicating at least one of a brightness and a color tone of a sky which are determined at least based on an azimuth direction and a height of the sun; and determining, by the controller, an illumination mode based on the sky information, and performing, by the controller, lighting simulating a sky, based on the illumination mode.

In addition, in order to achieve the above-described object, an aspect of a program according to the present disclosure causes a computer to implement the light environment rendering method.

According to the present disclosure, it is possible to reproduce an artificial sky while suppressing an increase in size.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Hereinafter, an embodiment of the present disclosure will be described with reference to the drawings. It should be noted that the subsequently-described embodiment each show a specific example of the present disclosure. Therefore, numerical values, shapes, materials, structural components, the arrangement and connection of the structural components, etc. shown in the following embodiment are mere examples, and are not intended to limit the scope of the present disclosure. Furthermore, among the structural components in the following embodiment, components not recited in the independent claim which indicates the broadest concept of the present disclosure are described as arbitrary structural components.

Moreover, "substantially" and "approximately" mean, for example in the case of "substantially the same", not only exactly the same, but what would be recognized as essentially the same as well.

In addition, each of the diagrams is a schematic diagram and thus is not necessarily strictly illustrated. In each of the diagrams, substantially the same structural components are assigned with the same reference signs, and redundant descriptions will be omitted or simplified.

The following describes a light environment rendering system, a lighting apparatus, a light environment rendering method and a storage medium according to an embodiment of the present disclosure.

Embodiment (Configuration)

First, a configuration of light environment rendering system 100 according to the present embodiment shall be described with reference to FIG. 1.

Figure 1:
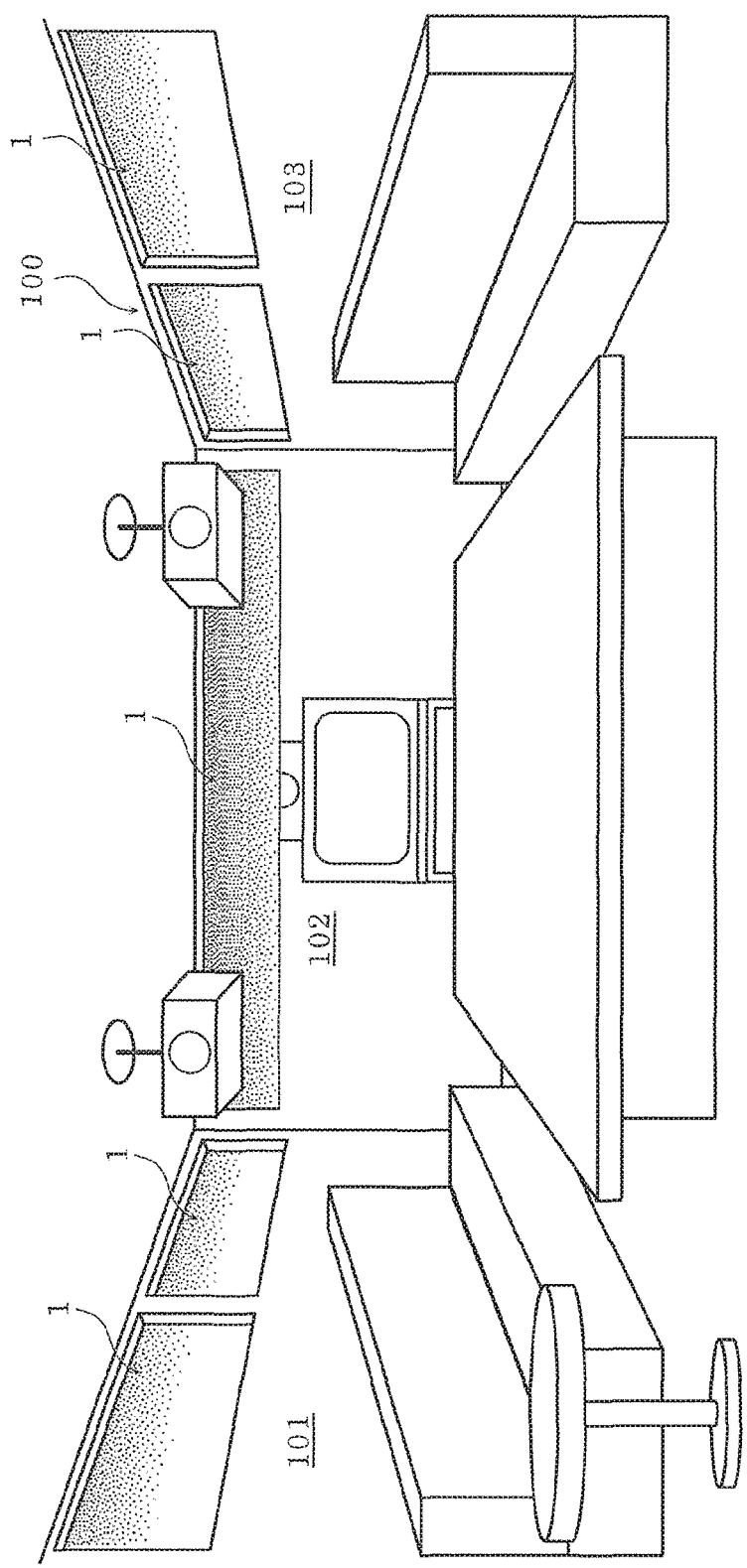
FIG. 1 is a schematic diagram which illustrates a light environment rendering system according to an embodiment.
Figure 2:
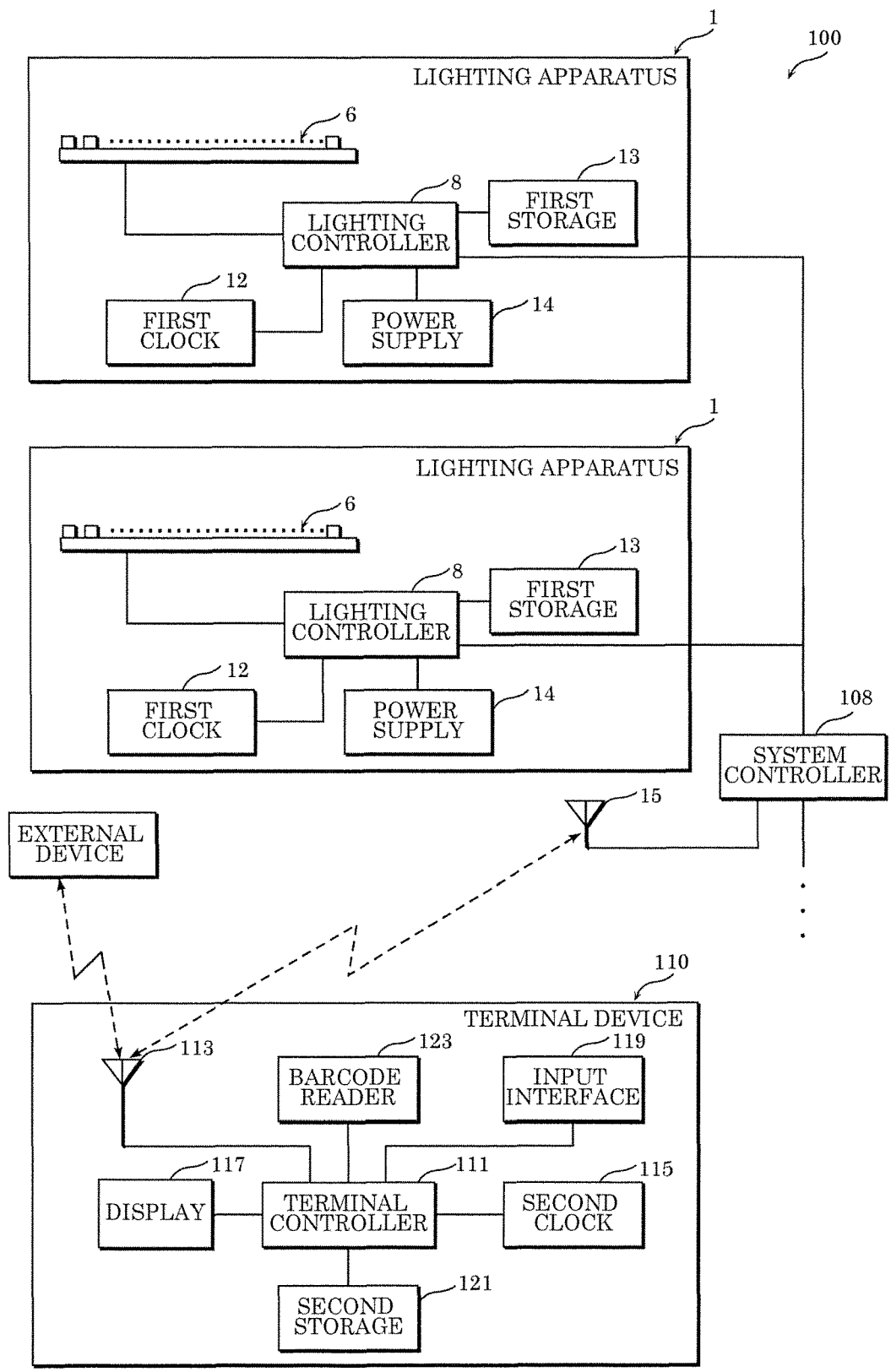
FIG. 2 is a block diagram which illustrates a lighting apparatus according to the embodiment.
Figure 3:
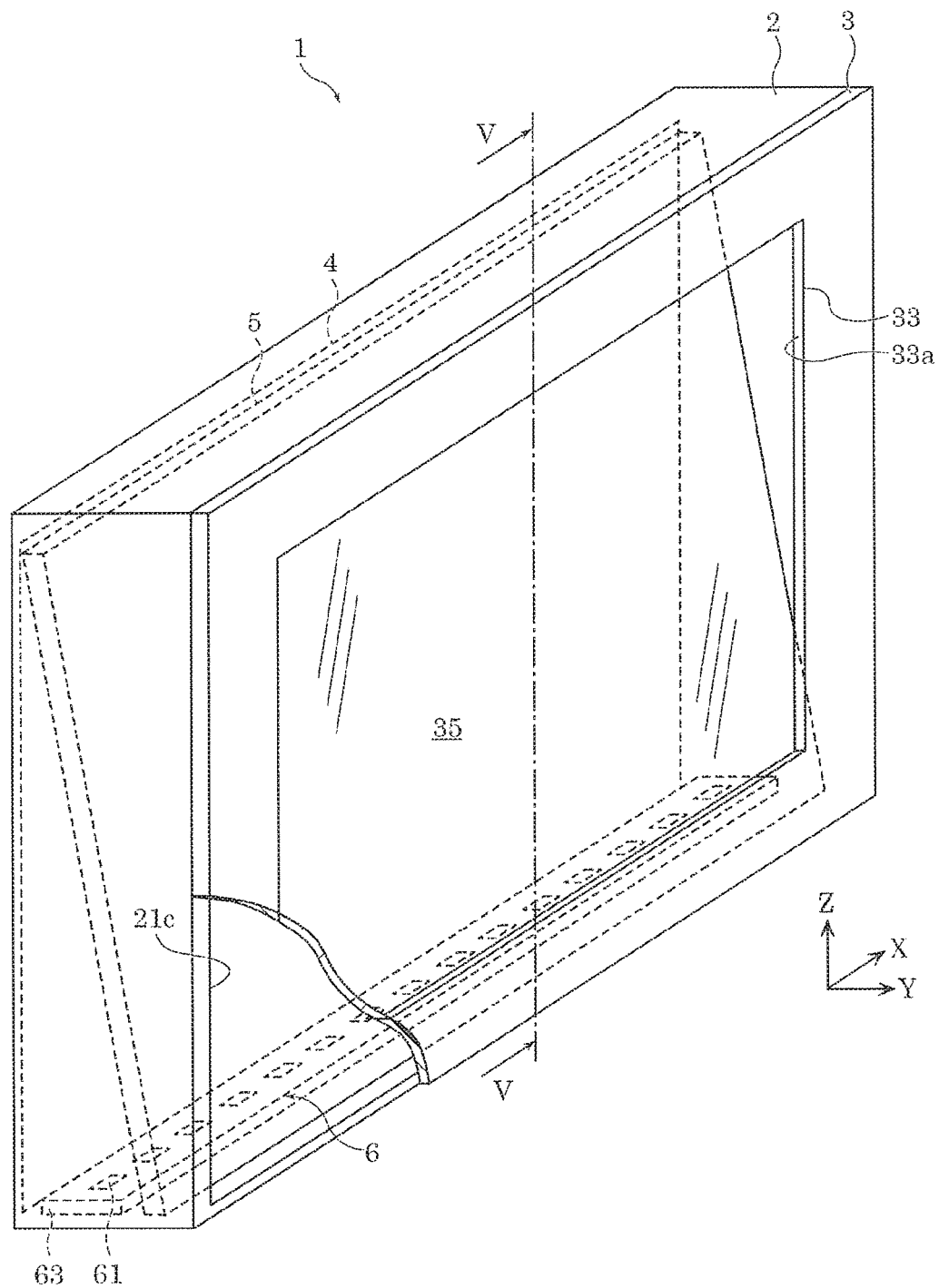
FIG. 3 is a perspective view which illustrates the lighting apparatus according to the embodiment.
Figure 4:
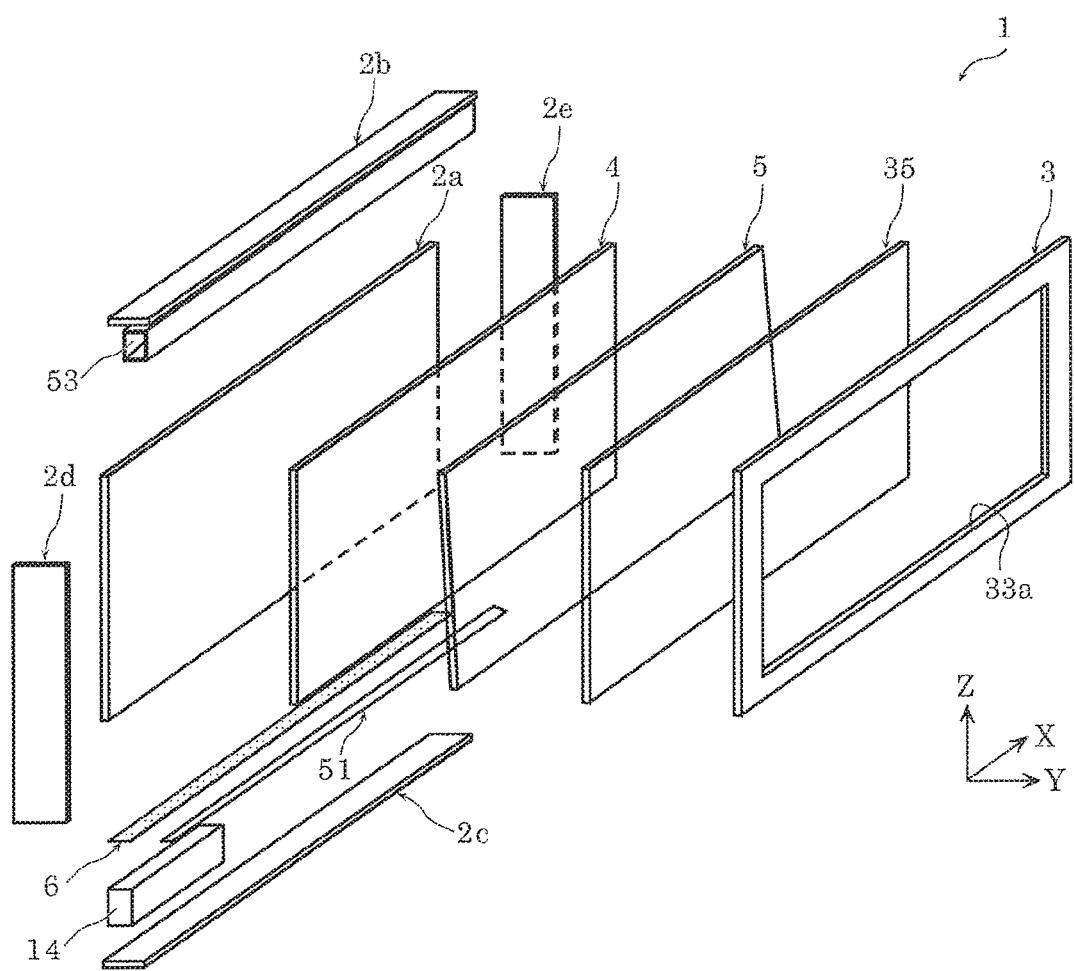
FIG. 4 is an exploded perspective view which illustrates the lighting apparatus according to the embodiment.
Figure 5:
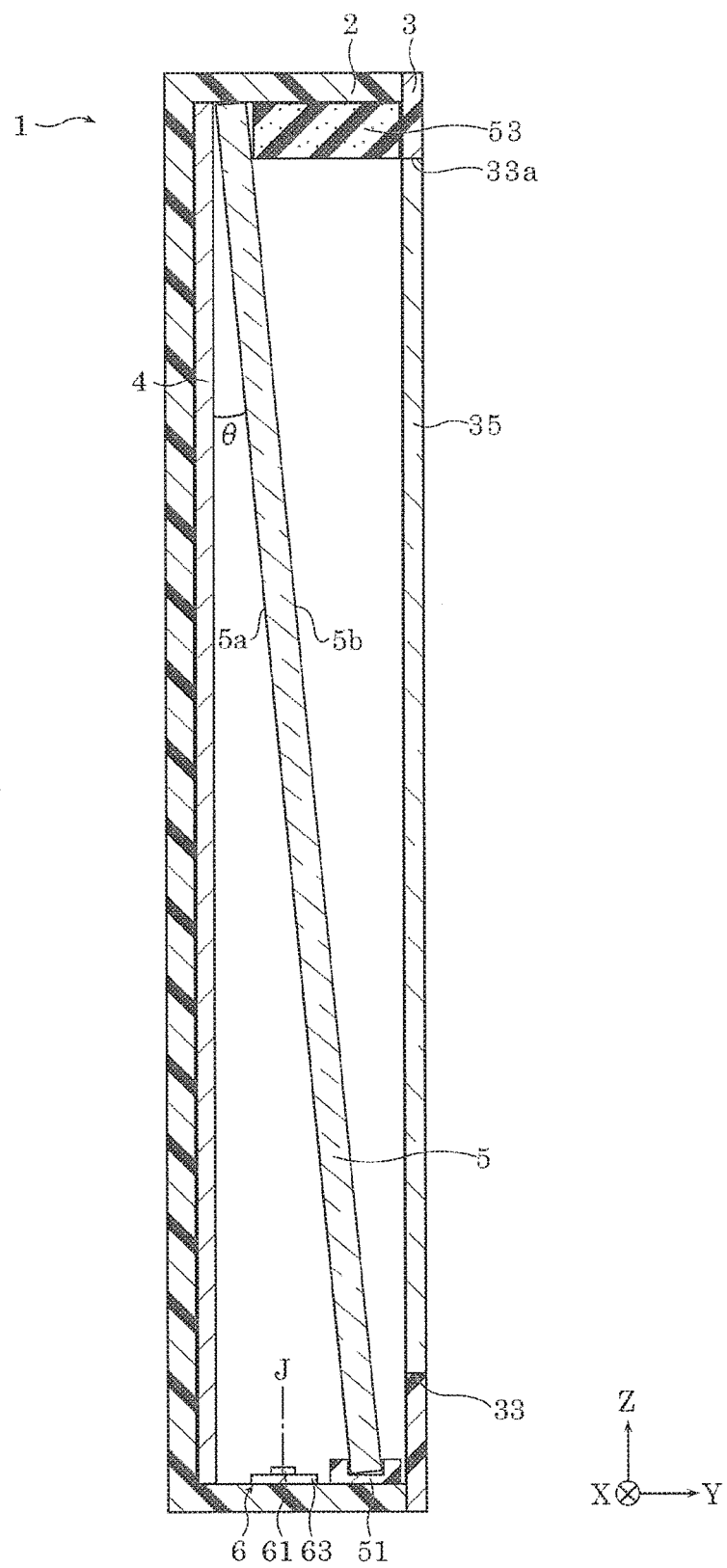
FIG. 5 is a cross-sectional view which illustrates the lighting apparatus according to the embodiment, along the line V-V of FIG. 3.

FIG. 1 is a perspective diagram which illustrates light environment rendering system 100 according to the embodiment. FIG. 2 is a block diagram which illustrates lighting apparatus 1 according to the embodiment. FIG. 3 is a perspective diagram which illustrates lighting apparatus 1 according to the embodiment. FIG. 4 is an exploded perspective view which illustrates lighting apparatus 1 according to the embodiment. FIG. 5 is a cross-sectional view which illustrates lighting apparatus 1 according to the embodiment, along the line V-V of FIG. 3.

FIG. 3 illustrates lighting apparatus 1 in which directions are defined as follows: the direction in which light sources 61 are aligned is an X-axis direction; the direction orthogonal to lighting apparatus 1 is a Y-axis direction; and a direction orthogonal to the X-axis direction and the Y-axis direction is a Z-axis direction. It should be noted that the directions illustrated in FIG. 4 and subsequent figures correspond to those illustrated in FIG. 3.

As illustrated in FIGS. 1 and 2, light environment rendering system 100 is installed on a part of a structure such as a ceiling, a wall, or the like of a facility in which it is difficult to obtain natural lighting such as a meeting room without a window, an underground mall, a tunnel, etc. Light environment rendering system 100 includes a plurality of lighting apparatuses 1, system controller 108, first communicator 15, and terminal device 110. System controller 108 is an example of a controller. Lighting apparatus 1 is an example of each of a first lighting apparatus and a second lighting apparatus. According to the present embodiment, five lighting apparatuses 1 are installed on a part of a structure. First communicator 15 is an example of a communicator.

The plurality of lighting apparatuses 1 are disposed at different positions of a part of a structure. According to the present embodiment, the part of a structure includes wall 101, wall 102 different from wall 101, and wall 103 different from wall 101 and wall 102. Wall 101 is a first wall which is positioned on the left side in the drawing, wall 102 is a second wall which is orthogonal to wall 101 and is positioned on the front end in the drawing, and wall 103 is a third wall which faces wall 101 and is positioned on the right side in the drawing.

According to the present embodiment, lighting apparatuses 1 are disposed on wall 101, wall 102, and wall 103 in a room. It should be noted that the arrangement of lighting apparatuses 1 is not limited to the example of the present embodiment, and lighting apparatuses 1 may be arranged in any manner. For example, wall 101 is a wall positioned on the west side, wall 102 is a wall positioned on the north side, and wall 103 is a wall positioned on the east side. Although lighting apparatus 1 on wall 102 is different from the other lighting apparatuses 1 in size, lighting apparatuses 1 each have the same configuration, and thus description for the other lighting apparatuses will be omitted.

Next, a configuration of lighting apparatus 1 will be described.

As illustrated in FIG. 3, lighting apparatuses 1 are each a lighting apparatus which is installed on a part of a structure so as to form an illumination space, and is capable of performing illumination rendering for cause a user to simulatively feel outdoor light. Lighting apparatus 1 is installed, for example, in such a manner that lighting apparatus 1 is recessed in a part of a structure.

As illustrated in FIG. 2 and FIG. 3, lighting apparatus 1 includes: casing 2; frame 3; reflector plate 4; diffuser plate 5; holder 51; eaves 53; light emitting module 6; lighting controller 8; first clock 12; first storage 13; and power supply 14.

Casing 2 has a flat box shape, and is substantially rectangular in a plan view. It should be noted that the shape of casing 2 is not limited to a substantially rectangular in a plan view, and may be a circular shape, a multiangular shape, a semicircle shape, etc. The shape of casing 2 is not specifically limited. In addition, the three dimensional shape of casing 2 is not specifically limited, and may be a spherical shape, a polyhedral shape, a cylindrical shape, etc.

Casing 2 houses at least diffuser plate 5 and light emitting module 6. Casing 2 includes container opening portion 21c which is open on a Y-axis plus side. Casing 2 may house lighting controller 8, first clock 12, first storage 13, and power supply 14. Alternatively, lighting controller 8, first clock 12, first storage 13, and power supply 14 may be disposed outside casing 2.

Casing 2 includes bottom wall portion 2a which has a substantially flat shape, first side wall portion 2b, second side wall portion 2c, third side wall portion 2d, and fourth side wall portion 2e.

Bottom wall portion 2a is a bottom wall which faces container opening portion 21c and is positioned on a Y-axis minus side of casing 2. Bottom wall portion 2a is substantially parallel to a plane defined by an X-axis direction and a Z-axis direction. First side wall portion 2b is a side wall disposed on an end of bottom wall portion 2a on a Z-axis plus side. First side wall portion 2b is substantially parallel to a plane defined by the X-axis direction and the Y-axis direction. Second side wall portion 2c is a side wall disposed on an end of bottom wall portion 2a on a Z-axis minus side, to face first side wall portion 2b. Second side wall portion 2c is substantially parallel to first side wall portion 2b. Third side wall portion 2d is a side wall disposed on an end of bottom wall portion 2a on an X-axis minus side. Third side wall portion 2d is substantially parallel to a plane defined by the Y-axis direction and the Z-axis direction. Fourth side wall portion 2e is a side wall disposed on an end of bottom wall portion 2a on an X-axis plus side, to face third side wall portion 2d. Fourth side wall portion 2e is substantially parallel to third side wall portion 2d.

Frame 3 is a flat component having a substantially rectangular shape. Frame 3 has opening portion 33 having a substantially rectangular shape, in a center portion thereof. Frame 3 is disposed on an end of casing 2 on a Y-axis plus side, to cover container opening portion 21c. In other words, frame 3 is disposed on the Y-axis plus side of casing 2 so as to overlap an outer periphery side of casing 2 in a plan view. It should be noted that frame 3 may be designed simulating a window frame so as to provide sensation as if outdoor light is entering through a window. It should also be noted that the shape of frame 3 is not limited to a rectangular shape, and may be a circular shape, a multiangular shape, a semicircle shape, etc. The shape of frame 3 is not specifically limited.

Opening portion 33 in frame 3 has inner circumference surface 33a which has a black or a blue color that suppresses reflection of light. Inner circumference surface 33a may be painted black or blue, and delustered so as to suppress reflection of light. It should to be noted that frame 3 may be made of a material which has a black or a blue color that suppresses reflection of light. In the case where inner circumference surface 33a is black, inner circumference surface 33a is capable of easily absorbing light.

Light transmissive plate 35 is light transmissive, and is, for example, a flat component having a substantially rectangular shape. Light transmissive plate 35 is fixed to frame 3 to cover opening portion 33 of frame 3. Light transmissive plate 35 is formed using a light transmissive resin material such as acrylic, polycarbonate, etc., or a light transmissive material such as a transparent glass material, etc. It should be noted that the shape of light transmissive plate 35 is determined according to opening portion 33, and is not limited to a substantially rectangular shape. The shape of light transmissive plate 35 may be a circular shape, a multiangular shape, a semicircle shape, etc. The shape of light transmissive plate 35 is not specifically limited. In addition, light transmissive plate 35 need not be provided to opening portion 33, and is not an indispensable structural component.

Reflector plate 4 is a flat component having substantially a rectangular shape, and is a mirror which reflects incident light. Reflector plate 4 is disposed on a surface of bottom wall portion 2a of casing 2, on the Y-axis plus side. In casing 2, bottom wall portion 2a faces container opening portion 21c. Reflector plate 4 is housed in casing 2 such that a mirror surface faces the Y-axis plus side.

Reflector plate 4 reflects light which is incident directly from light source 61 that will be described later, and light which is reflected by incident surface 5a of diffuser plate 5 and is incident on reflector plate 4. It should be noted that reflector plate 4 only needs to reflect incident light, and may be, for example, a plate which is black in color. It should also be noted that the shape of reflector plate 4 is not limited to a rectangular shape, and may be a circular shape, a multiangular shape, a semicircle shape, etc. The shape of reflector plate 4 is not specifically limited.

Reflector plate 4 is implemented by, for example, mirror finishing applied through mirror coating or polishing, a fine optical structure, an anisotropic material, etc. In addition, reflector plate 4 may be, for example, a mirror including metal such as aluminum or silver that is deposited on a component such as resin, rubber, or metal.

As illustrated in FIG. 3 to FIG. 5, diffuser plate 5 is a plate component having a substantially rectangular shape in a plan view. Diffuser plate 5 is housed in casing 2 such that diffuser plate 5 faces the surface of reflector plate 4, on the Y-axis plus side of reflector plate 4. In addition, diffuser plate 5 is held by holder 51 in such a manner that diffuser plate 5 is oriented at a predetermined angle θ with respect to reflector plate 4. The gap between diffuser plate 5 and reflector plate 4 is gradually reduced from the Z-axis minus side toward the Z-axis plus side. According to the present embodiment, the end of diffuser plate 5 on the Z-axis plus side comes in contact with the surface of reflector plate 4 on the Z-axis plus side. However, diffuser plate 5 may be spaced apart from reflector plate 4. In addition, the end of diffuser plate 5 on the Z-axis plus side is held by reflector plate 4 and eaves portion 53 such that the end of diffuser plate 5 is sandwiched between reflector plate 4 and eaves portion 53.

Here, the predetermined angle θ is in a range from 2 degrees or greater to 45 degrees or less. According to the present disclosure, the predetermined angle θ formed by diffuser plate 5 and reflector plate 4 is 5 degrees.

Diffuser plate 5 is transmissive and has a light diffusion properties for diffusing light. Diffuser plate 5 includes incident surface 5a and light exit surface 5b. Incident surface 5a is, for example, a surface on which light emitted by light emitting module 6 is incident. Light exit surface 5b is, for example, a surface from which light incident on incident surface 5a and passes through diffuser plate 5 exits.

Diffuser plate 5 includes a resin material such as acrylic, poly ethylene terephthalate (PET), etc., or glass, as a base material. Diffuser plate 5 may be an opaque white diffuser panel in which light diffusion materials are dispersed. Such a diffuser panel may be manufactured by resin-molding, into a predetermined shape, a light transmissive resin material to which a light diffuse material is mixed. As the light diffuse material, a light reflective fine particle such as a silica particle may be used.

In addition, diffuser plate 5 may be configured by, not dispersing the light diffusion materials inside, but forming, on the surface of a transparent panel which is a base material, an opaque white light diffusion film including a light diffuse material, etc.

In addition, diffuser plate 5 may be configured to have light diffusion properties by, not using a light diffuse material, but applying light diffusion treatment. For example, diffuser plate 5 having light diffusion properties may be configured by forming fine unevenness on the surface of the transparent panel by applying grain finish or the like, or printing a dot pattern on the surface of the transparent panel. In this case, in diffuser plate 5, the fine unevenness may be in size that the texture cannot be visually recognized. It should be noted that, even when light diffusion treatment is applied, diffuser plate 5 may include a light diffuse material in order to enhance the light diffusion properties.

According to the present embodiment, as one example of diffuser plate 5, a Rayleigh scatter panel which causes Rayleigh scattering of incident light may be employed. The Rayleigh scatter panel is a component which includes, for example, resin such as light-transmissive acrylic, a glass material, etc., as a base material, and nanocomposite materials dispersed therein. The nanocomposite material is oxidized metal such as titanium oxide, zinc oxide, zirconia oxide, etc. When a particle size of the nanocomposite material is sufficiently smaller than a wavelength of light, Rayleigh scattering of light which is incident on diffuser plate 5 occurs. With diffuser plate 5 described above, Rayleigh scattering of at least light having a wavelength in a range from 435 nm or greater to 495 nm or less may be caused.

Holder 51 is a component in which a groove extending in the X-axis direction is formed, and which holds diffuser plate 5. Holder 51 is mounted on second side wall portion 2c. Holder 51 houses an end of diffuser plate 5 on the Z-axis minus direction in the groove, thereby suppressing movement of diffuser plate 5.

Eaves portion 53 is disposed on a surface of first side wall portion 2b on the Z-axis minus side, to be located on the Y-axis plus side and the Z-axis plus side with respect to diffuser plate 5. Eaves portion 53 is a component which is black in color for suppressing reflection of light. According to the present embodiment, eaves portion 53 has a surface on the Z-axis minus side which is flush with inner circumference surface 33a of opening portion 33 of frame 3. However, eaves portion 53 may be disposed so as to be hidden by frame 3 in a plan view of lighting apparatus 1. It should be noted that, although eaves portion 53 is separately provided in casing 2, first side wall portion 2b may serve as eaves portion 53. In this case, the surface of first side wall portion 2b on the Z-axis minus side may have a black color which absorbs light, or a black light absorbing sheet which absorbs light may be uniformly disposed.

Light emitting module 6 is a module which includes a plurality of light sources 61 and circuit board 63 on which the plurality of light sources 61 are mounted. Light emitting module 6 is mounted on second side wall portion 2c, has an elongated shape in the X-axis direction, and includes the plurality of light sources 61 aligned in the X-axis direction. Light emitting module 6 is disposed between reflector plate 4 and diffuser plate 5 on the Z-axis minus side of reflector plate 4 and diffuser plate 5. In other words, light emitting module 6 is disposed in such a manner that optical axis J of light sources 61 is sandwiched between reflector plate 4 and diffuser plate 5.

More specifically, the plurality of light sources 61 are disposed on a side facing the rear surface of diffuser plate 5 along one of the ends of diffuser plate 5. In other words, the plurality of light sources 61 are oriented to emit light toward reflector plate 4 and diffuser plate 5. The rear surface of diffuser plate 5 is one example of incident surface 5a of diffuser plate 5. The plurality of light sources 61 are disposed on one side facing diffuser plate 5, along the rear surface of diffuser plate 5, and emit light including blue light onto diffuser plate 5. According to the present embodiment, optical axis J of each of the plurality of light sources 61 extends in the Z-axis direction and intersects with diffuser plate 5. However, optical axis J of each of the plurality of light sources 61 may intersect with reflector plate 4.

It should be noted that the plurality of light sources 61 are disposed to be along the rear surface of diffuser plate 5 and emit light including blue light onto diffuser plate 5 as described above, and this means that light emitted by the plurality of light sources 61 includes light which is obliquely incident on incident surface 5a of diffuser plate 5.

The plurality of light sources 61 include a plurality of white light sources, a plurality of blue light sources, and a plurality of orange light sources.

It should be noted that the plurality of light sources 61 only need to emit light including blue light, and thus may be white light sources or blue light sources. Here, blue light is not strictly meaning blue, but meaning light generally looks blue. In addition, white light is not strictly meaning white, but meaning light generally looks white. In addition, orange light is not strictly meaning orange, but meaning light generally looks orange.

The plurality of light sources 61 are aligned at substantially regular intervals along the X-axis direction of circuit board 63. The order of arrangement of the plurality of light sources 61, and the number of lines may be changed as appropriate.

The plurality of light sources 61 may be, as they are called, surface mount device (SMD) light emitting diode (LED) elements. Specifically, the SMD LED element is an LED element of a package-type formed by mounting a light emitting element in a cavity molded by resin, and sealing the cavity by a phosphor-containing resin.

The plurality of light sources 61 are turned on, dimmed (adjustment of brightness), and turned off under the control of lighting controller 8. In addition, lighting controller 8 controls power supply 14 to cause power supply 14 to perform dimming control and toning control on the plurality of light sources 61.

It should be noted that the plurality of light sources 61 are not limited to the above-described configuration, and a chip on board (COB) module including an LED chip directly mounted on circuit board 63 may be used. In addition, the light emitting element included by each of the plurality of light sources 61 is not limited to an LED, and may be, for example, a semiconductor light emitting element such as a semiconductor laser, or other solid-state light emitting elements such as EL elements of an organic electro luminescence (EL), an inorganic EL, etc.

Lighting controller 8 changes an output of the light emitted by the plurality of light sources 61. More specifically, lighting controller 8 controls operations of light emitting module 6, such as turning on, turning off, dimming, toning, etc., according to a control signal transmitted by a user via a remote control or the like. Lighting controller 8 performs dimming control on the white light sources, the blue light sources, and the orange light sources. For example, lighting controller 8 increases the brightness of the white light sources by controlling power supply 14, and decreases the brightness of the blue light sources and the orange light sources by controlling power supply 14. Lighting controller 8 includes a circuit, etc., for controlling light emitting module 6, etc. Lighting controller 8 implements the above-described operations by a microcomputer, processor, etc., or a dedicated circuit, which control a value of a current supplied to light emitting module 6 according to an input signal.

Lighting controller 8 performs lighting simulating an actual sky, based on lighting information assigned to the respective lighting apparatuses 1. Here, lighting information is information for causing lighting apparatus 1, when lighting apparatus 1 is a window, for example, to artificially reproduce the look of the sky such that a user feels as if the user is viewing the actual sky through the window.

For that reason, for example, lighting controller 8 reproduces various states of the sky such as the blue sky, the cloudy sky, a sunset, an evening, and so on, according to information indicating a current time obtained from first clock 12.

In the case where the blue sky is reproduced, for example, lighting controller 8 sets the output of the white light sources at approximately the middle level, and sets the output of the blue light sources at a level greater than approximately the middle level, in light emitting module 6. Furthermore, lighting controller 8 sets the output of orange light sources at zero. In other words, light having a gradation that changes gradually from white light to blue light from the lower side toward the upper side of diffuser plate 5 exits through diffuser plate 5, and thus it looks as if the actual sky extends far away from light transmissive plate 35.

In addition, in the case where the cloudy sky is reproduced, for example, lighting controller 8 sets the output of the white light sources at approximately the middle level, and sets the output of the blue light sources at a level less than approximately the middle level, in light emitting module 6. Furthermore, lighting controller 8 sets the output of orange light sources at zero. In this case, bright white light exits through diffuser plate 5 from the side close to light emitting module 6, and white light which gradually decreases the brightness exits through diffuser plate 5 with increasing distance from light emitting module 6. In other words, light having a gradation that gradually decreases in the brightness from the lower side toward the upper side of diffuser plate 5 exits through diffuser plate 5, and thus it looks as if the actual cloudy sky extends far away from light transmissive plate 35.

In addition, in the case where a sunset is reproduced, for example, lighting controller 8 sets the output of the orange light sources in light emitting module 6 at approximately the middle level, and sets the output of the white light sources and the blue light sources in light emitting module 6 at a level less than approximately the middle level. In this case, bright orange light exits through diffuser plate 5 from the side close to light emitting module 6, and blue light which gradually decreases the brightness exits through diffuser plate 5 with increasing distance from light emitting module 6. In other words, light having a gradation that changes gradually from orange light to blue light and also gradually decreases in the brightness from the lower side toward the upper side of diffuser plate 5 exits through diffuser plate 5, and thus it looks as if the actual sunset extends far away from light transmissive plate 35.

In addition, in the case where an evening sky is reproduced, for example, lighting controller 8 sets the output of the white light sources at zero or at approximately zero, and sets the output of the blue light sources at a level less than approximately the middle level, in light emitting module 6. Furthermore, lighting controller 8 sets the output of orange light sources at zero or at approximately zero. In this case, dark blue light exits through diffuser plate 5 from the side close to light emitting module 6, and light is less and less emitted with increasing distance from light emitting module 6. In other words, light having a gradation that gradually decreases in the brightness from the lower side toward the upper side of diffuser plate 5 exits through diffuser plate 5. Accordingly, the state of night is presented far away from light transmissive plate 35, and it looks as if the actual evening sky extends far away from light transmissive plate 35.

Lighting controller 8 stores obtained lighting information into first storage 13. In addition, lighting controller 8 may perform the lighting control on light emitting module 6 according to the current season, using past lighting information.

First clock 12 is a timer which is electrically connected to lighting controller 8, and outputs information which indicates a current time to lighting controller 8.

First storage 13 is a storage device which is electrically connected to lighting controller 8, and in which inputted lighting information, etc. is stored. The lighting information is information for controlling light emitting module 6 for reproducing various states of the sky such as the blue sky, the cloudy sky, a sunset, an evening, and so on. First storage 13 is a storage device in which a control program executed by lighting controller 8 is stored, in the case where lighting controller 8 includes a processor, a microcomputer, etc. First storage 13, for example, is implemented by a semiconductor memory.

Power supply 14 includes a power supply circuit which generates power for causing light emitting module 6 to emit light. Power supply 14 rectifies, smoothes, steps down, etc., power supplied from a power system, for example, to convert the power into DC power at a predetermined level, and supplies the DC power to light emitting module 6.

Power supply 14 switches on and off power supply to light emitting module 6, as a result of being controlled by lighting controller 8. For example, when an operation for turning on is received via an operation component such as a remote control, lighting controller 8 causes power supply 14 to supply power to light emitting module 6 to turn on light sources 61 of light emitting module 6. In addition, when the operation component receives an operation for turning off, lighting controller 8 causes power supply 14 to stop supplying power to light emitting module 6 to turn off light sources 61 of light emitting module 6.

Next, system controller 108, first communicator 15, and terminal device 110 of the light environment rendering system will be described.

System controller 108 is electrically connected to a plurality of lighting apparatuses 1, and controls an operation of each of the plurality of lighting apparatuses 1. System controller 108 determines an illumination mode on the basis of sky information which will be described later, and causes each of the plurality of lighting apparatuses 1 to perform lighting simulating a sky according to the illumination mode. More specifically, system controller 108 generates lighting information based on the illumination mode determined on the basis of the sky information, and transmits the lighting information to each of the plurality of lighting apparatuses 1. System controller 108 may synchronize, on the basis of the lighting information, timing for performing turning on, turning off, dimming, toning, etc., on each of the plurality of lighting apparatuses 1, or may perform turning on, turning off, dimming, toning, etc., for one or some of the plurality of lighting apparatuses 1. System controller 108 includes a circuit, etc., for controlling each of the plurality of lighting apparatuses 1. System controller 108 implements the operations using a microcomputer, a processor, or the like, or a dedicated circuit.

System controller 108 further determines, among the plurality of lighting apparatuses 1, one or more lighting apparatuses 1 positioned closer to the sun with respect to a selected one of the plurality of lighting apparatuses 1, based on at least: an installation azimuth direction; an installation height; and an installation location of each of the plurality of lighting apparatuses 1. Then, system controller 108 causes either one of: the one or more lighting apparatuses 1 determined to be positioned closer to the sun; and the other lighting apparatuses 1 among the plurality of lighting apparatuses 1 to emit light at a greater brightness than the others. More specifically, system controller 108 causes lighting apparatus 1 installed on wall 101 to emit light at a greater brightness than lighting apparatus 1 installed on wall 102. In addition, system controller 108 causes, among lighting apparatuses 1 installed on wall 101, lighting apparatus 1 positioned on the south side to emit light at a greater brightness than lighting apparatus 1 positioned on the north side.

System controller 108 updates sky information and changes the lighting performed by each of the plurality of lighting apparatuses 1 as time passes, based on the updated sky information. More specifically, system controller 108 continuously or discretely determines an illumination mode, so as to be in association with the sky information that changes over time, on the basis of the sky information obtained from terminal device 110, and continuously or discrete generates lighting information. System controller 108 associates lighting information with unique identification information of each of the plurality of lighting apparatuses 1. System controller 108 continuously or discretely transmits lighting information to each of the plurality of lighting apparatuses 1.

First communicator 15 is a communication interface such as an antenna, which receives sky information from terminal device 110 through radio communications. First communicator 15 is electrically connected to system controller 108. First communicator 15 receives the sky information from terminal device 110, and outputs the sky information to system controller 108. First communicator 15 continuously or discretely receives sky information in a repetitive manner.

Terminal device 110 transmits the sky information to system controller 108. Terminal device 110 has an information display function, and is, for example, a smartphone, a tablet, a personal computer, etc. Terminal device 110 is an operation terminal capable of operating a plurality of lighting apparatuses 1. Terminal device 110 has an application program for setting an installation azimuth direction, an installation height, and an installation location of each of the plurality of lighting apparatuses 1, and setting a current season, a current time, and the like. Terminal device 110 may be one example of an external device.

Terminal device 110 includes terminal controller 111, second communicator 113, second clock 115, display 117, input interface 119, second storage 121, and barcode reader 123.

Terminal controller 111 obtains sky information of various types, for each of the plurality of lighting apparatuses 1, and transmits the obtained sky information to a corresponding one of the plurality of lighting apparatuses 1 via second communicator 113. More specifically, terminal controller 111: determines sky information according to the installation azimuth direction, the installation height, and the installation location of each of the plurality of lighting apparatuses 1; receives the sky information which is determined, from an external server via a network; and transmits the sky information which is received, to the corresponding one of the plurality of lighting apparatuses 1. Sky information is, when lighting apparatus 1 is a window, for example, information for causing a user to feel as if the user is viewing an actual sky through the window, and information using at least one of a brightness and a color tone of the sky which are determined by the azimuth direction and the height of the sun. It is possible to easily obtain sky information via a network, by using CIE S 011/E:2003 ISO 15469;2003(E) in an external server. It should be noted that the sky information is not limited to this example. For example, sky information may be stored in advance in second storage 121. Sky information may be calculated by terminal controller 111, using a predetermined calculation formula stored in second storage 121. The external server is one example of the external device.

Since the actual sky changes from moment to moment as time proceeds, terminal controller 111 continuously or discretely obtains sky information according to the change. Terminal controller 111 continuously or discretely transmits the obtained sky information to system controller 108 via second communicator 113 and first communicator 15.

Terminal controller 111 is capable of obtaining the sky information of user's intended location according to the preference of the user, and transmitting the obtained sky information to system controller 108 via second communicator 113 and first communicator 15. In other words, the sky information obtained by terminal controller 111 is not limited to the illumination mode for implementing an installation location of each of the plurality of lighting apparatuses 1.

Second communicator 113 is a communication interface such as an antenna, which transmits sky information to first communicator 15 through radio communications. Second communicator 113 is electrically connected to terminal controller 111. Second communicator 113 continuously or discretely transmits sky information, in a repetitive manner, to each of the plurality of lighting apparatuses 1.

Second clock 115 is a timer which is electrically connected to terminal controller 111, and outputs information which indicates a current time to terminal controller 111.

Figure 7:
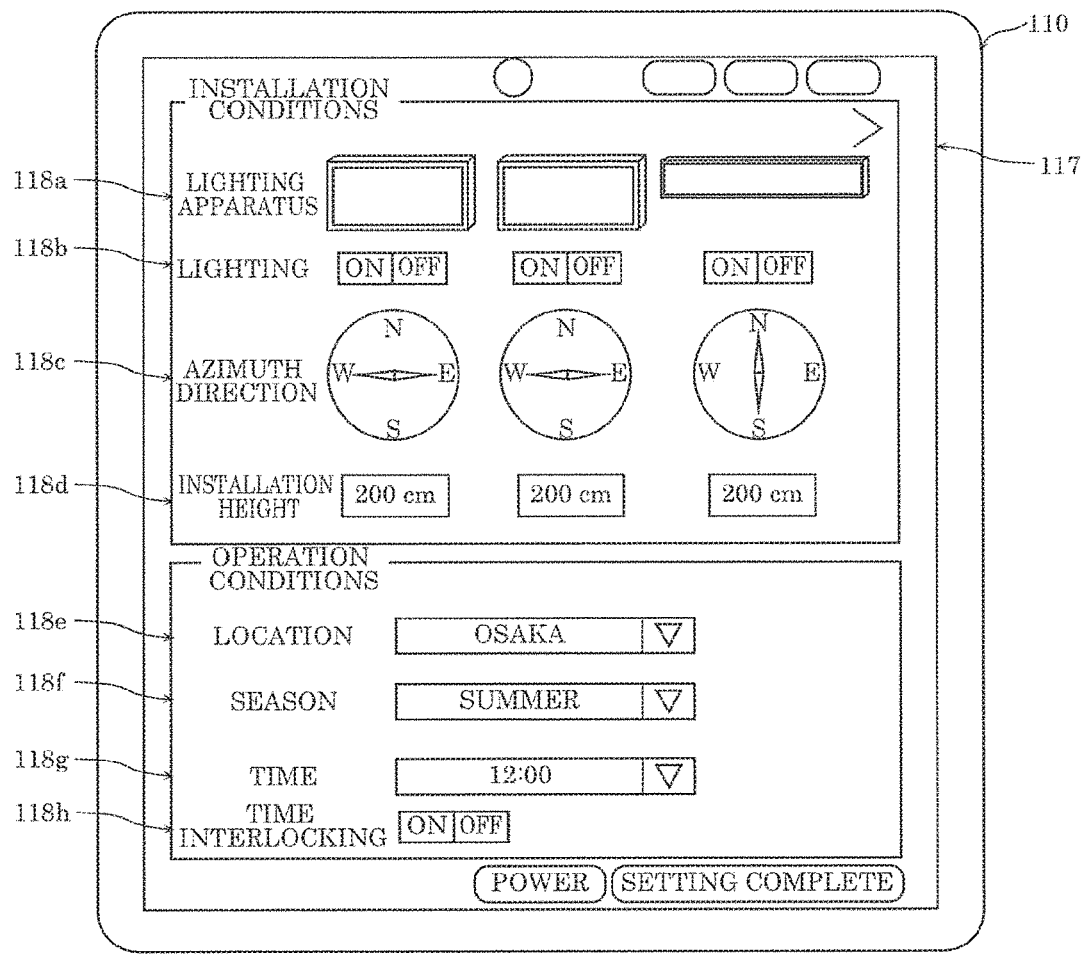
FIG. 7 is a front view of a terminal device of the light environment rendering system according to the embodiment.

Display 117 is a monitor such as a liquid-crystal display, LED display, an organic EL display, etc. Display 117 displays an operation screen for prompting a user to operate a plurality of lighting apparatuses 1. More specifically, mark 118*a* for selecting lighting apparatus 1, mark 118*b* for selecting an on state or an off state of lighting apparatus 1, mark 118*c* for inputting an installation azimuth direction of lighting apparatus 1, mark 118*d* for inputting an installation height of lighting apparatus 1, mark 118*e* for inputting an installation location of the light environment rendering system, mark 118*f* for inputting a season, mark 118*g* for inputting a current time, mark 118*h* for enabling time interlocking, etc., are displayed on display 117 as illustrated in FIG. 7.

In addition, subsequent to the settings of each of the plurality of lighting apparatuses 1, a screen for inputting a location to be illuminated by lighting apparatus 1 is displayed on display 117. In this case, a location to be illuminated by lighting apparatus 1 is inputted via input interface 119 or an operation component, etc. such as a remote control. It should be noted that display 117 may be, for example, a touch panel of an electrostatic capacitance type, etc. In this case, display 117 may serve as input interface 119.

Input interface 119 is a device for inputting, for example, information which indicates at least: an installation azimuth direction; an installation height; and an installation location of each of the plurality of lighting apparatuses 1. Input interface 119 is electrically connected to terminal controller 111, and terminal controller 111 performs a predetermined operation based on information inputted via input interface 119 by a user. According to the present embodiment, information inputted via input interface 119 by the user is information which indicates an installation azimuth direction of each of the plurality of lighting apparatuses 1, an installation height of each of the plurality of lighting apparatuses 1, an installation location of the light environment rendering system, a current season, a current time, etc.

In addition, input interface 119 may serve also as an operation component to which a desired location, a desired season, a desired time, etc. for implementing lighting performed by light environment rendering system 100 can be inputted, according to the preference of a user.

Second storage 121 is a storage device which is electrically connected to terminal controller 111, and in which various data items such as determined sky information are stored. Second storage 121 is a storage device in which a control program executed by terminal controller 111 is stored, when terminal controller 111 includes a processor, a microcomputer, etc. Second storage 121 is implemented by a semiconductor memory, for example.

Barcode reader 123 is a device capable of reading a barcode assigned to each of lighting apparatuses 1. Barcode reader 123 transmits, to terminal controller 111, the barcode which barcode reader 123 has read. The barcode, for example, may be attached to each of lighting apparatuses 1, or may be attached to a packaging container or the like of each of lighting apparatuses 1.

With such lighting apparatus 1 as described above, for example, light emitted from light sources 61 of light emitting module 6 is partially incident on incident surface 5a of diffuser plate 5, passes through the inside of diffuser plate 5, is diffused by light exit surface 5b of diffuser plate 5, and exits diffuser plate 5, and is partially reflected by incident surface 5a of diffuser plate 5, travels to reflector plate 4, reflected by reflector plate 4, and is incident on incident surface 5a of diffuser plate 5. These processes are repeated. In this manner, light emitted from light source 61 is repeatedly diffused and reflected by diffuser plate 5 and reflector plate 4, and exits after diffusion.

Accordingly, light having a high luminance level is emitted from light exit surface 5b of diffuser plate 5 in proximity to light source 61, and light having a lower luminance level is emitted from light exit surface 5b of diffuser plate 5 with increasing distance from light sources 61. According to the present embodiment, bright white light exits through diffuser plate 5 from the side close to light emitting module 6, blue light which gradually increases the brightness exits through diffuser plate 5 with increasing distance from light emitting module 6, and the light looks like having a gradation in which the color temperature or the luminance level of light gradually changes according to a distance from light sources 61. In such a manner, light which provides a sense of a color and a luminance gradient which are similar to the actual sky having a sense of depth is emitted from diffuser plate 5.

The following describes a sense of depth which a person feels. The sense of depth which a person feels is felt due to a phenomenon such as an angle of convergence, a result of focusing, etc. For example, when a user sees a first object that is present forward of the user, an image seen by a right eye of the user is different from an image seen by a left eye of the user. An angle formed by the first object and the right and left eyes of a user is called an angle of convergence. In addition, for example, when a user sees a second object that is present further away from user than the first object, angle of convergence $\varphi 2$ formed by the second object and the right and left eyes of a user is less than angle of convergence $\varphi 1$. More specifically, when a distance between the both eyes of the user and the first object is depth distance L1 and a distance between the both eyes of the user and the second object is depth distance L2, angles of convergence $\varphi 1$ and $\varphi 2$ and depth distances L1 and L2 satisfy a relationship $\varphi 1 > \varphi 2$ and a relationship L1<L2. In addition, the focusing of eyeballs is another factor of feeling a sense of a depth. With the focusing of eyeballs, in order to obtain a clear image of each of the first object and the second object, a thickness of a crystalline lens changes according to a distance from the first object and a distance from the second object. A distance from the first object and a distance from the second object are obtained based on information indicating a thickness of a crystalline lens. In this manner, a user feels a sense of a depth by obtaining at least one of the angle of convergence and a result of the focusing.

When a user sees lighting apparatus 1 which is turned on, since diffuser plate 5 is held in a state in which diffuser plate 5 is oriented at a predetermined angle $\theta$ with respect to reflector plate 4, even if an image of the user is reflected on diffuser plate 5, the image of the user cannot be perceived by the user. In addition, since reflector plate 4 is present on a side facing incident surface 5a of diffuser plate 5, an image of diffuser plate 5 is multiply reflected on reflector plate 4 due to a phenomenon of a coupled mirror of diffuser plate 5 and reflector plate 4. Since a multiply reflected image of diffuser plate 5 on reflector plate 4 is seen by a user in an overlapped manner, the distance between diffuser plate 5 and reflector plate 4 is difficult to recognize. Thus, with lighting apparatus 1, it is possible to feel a sense of depth.

(Operation)

An operation regarding light environment rendering system 100, lighting apparatus 1, a light environment rendering method, and a program which causes a computer to implement the light environment rendering method according to the present embodiment will be described with reference to FIG. 6 and FIG. 7.

Figure 6:
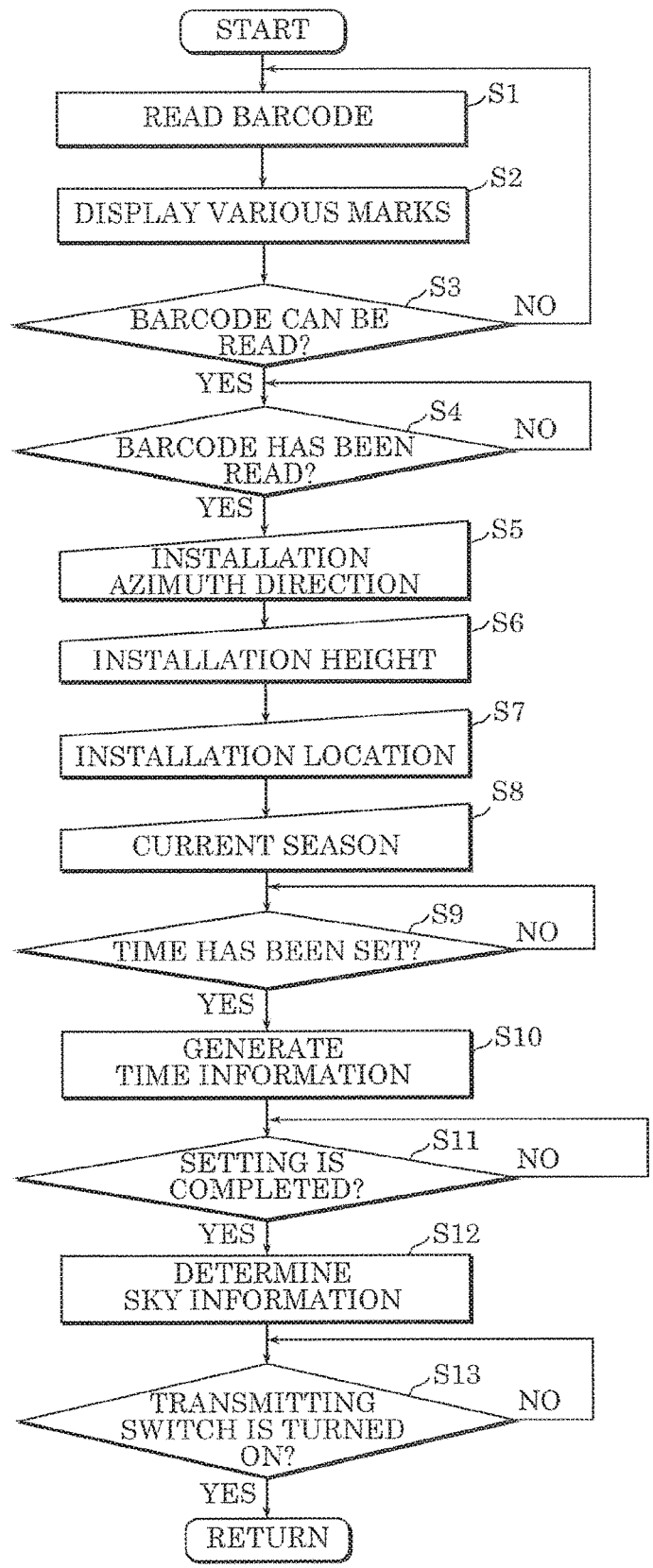
FIG. 6 is a flowchart which illustrates a procedure of setting the light environment rendering system according to the embodiment.

FIG. 6 is a flowchart which illustrates a procedure of setting light environment rendering system 100 according to the embodiment. FIG. 7 is a front view of terminal device 110 of light environment rendering system 100 according to the embodiment.

A plurality of lighting apparatuses 1 are arranged as illustrated in FIG. 1. The following describes settings of sky information according to each of the plurality of lighting apparatuses 1. First, a user turns on the power supply of terminal device 110 such that barcodes assigned to lighting apparatuses 1 can be read.

As illustrated in FIG. 6, the user reads the barcodes of the plurality of lighting apparatuses 1 using terminal device 110 (S1).

Next, various marks are displayed on display 11 of terminal device 110 (S2). FIG. 7 illustrates display 117 on which the various marks are displayed. More specifically, mark 118a for selecting lighting apparatus 1 among the plurality of lighting apparatuses 1, mark 118b for selecting an on state or an off state of lighting apparatus 1, mark 118c for inputting an installation azimuth direction of lighting apparatus 1, mark 118d for inputting an installation height of lighting apparatus 1, mark 118e for inputting an installation location of light environment rendering system 100, mark 118f for inputting a season, mark 118g for inputting a current time, mark 118h for enabling time interlocking, etc., are displayed on display 117.

Next, terminal controller 111 determines whether or not barcode reader 123 of terminal device 110 is in a state in which barcode reader 123 is capable of reading a barcode (S3).

In the case where terminal controller 111 determines that barcode reader 123 in not in the state in which barcode reader 123 is capable of reading a barcode (NO in S3), the operation returns to Step S1.

On the other hand, in the case where terminal controller 111 determines that barcode reader 123 is in the state in which barcode reader 123 is capable of reading a barcode (YES in S3), terminal controller 111 determines whether or not a barcode has been read (S4).

In the case where terminal controller 111 determines that barcode has not been read (NO in S4), the operation returns to Step S4. In other words, terminal controller 111 sequentially determines whether or not a barcode has been read until a user performs an operation of reading a barcode using barcode reader 123. It should be noted that in the case where an operation of reading a barcode is not performed for a predetermined period of time, the operation may return to Step S1, or this flow of the operation may be ended.

In the case where terminal controller 111 determines that barcode has been read (YES in S4), the operation proceeds to the next Step S5.

Next, the user inputs an azimuth direction of installing each of lighting apparatuses 1, via input interface 119 for each of lighting apparatuses 1, while viewing display 117 (S5).

Next, the user inputs a height of installing each of lighting apparatuses 1, via input interface 119 for each of lighting apparatuses 1, while viewing display 117 (S6).

Next, the user inputs a location of installing each of lighting apparatuses 1, via input interface 119 for each of lighting apparatuses 1, while viewing display 117 (S7).

Next, the user inputs a current season via input interface 119, while viewing display 117 (S8).

Next, terminal controller 111 determines whether or not a time has been set (S9).

In the case where terminal controller 111 determines that a time has not been set (NO in S9), the operation returns to Step S9. In other words, terminal controller 111 sequentially determines whether or not a time has been inputted via input interface by a user until the user inputs a time via input interface 119. It should be noted that in the case where a time is not inputted for a predetermined period of time, the operation may return to Step S1, or this flow of the operation may be ended.

In the case where terminal controller 111 determines that a time has been set (YES in S9), terminal controller 111 sets a time for second clock 115, and generates time information for enabling time interlocking with a time of first clock 12 of each of lighting apparatuses 1 (S10). For example, the time interlocking is a timer function which system controller 108 has, and performed by system controller 108 receiving time information and outputting the time information to each of lighting apparatuses 1. System controller 108 may have a lighting mode for switching between the blue sky, the cloudy sky, the evening sky, etc., using the timer function. When a predetermined period of time passes after light for reproducing the artificial blue sky is emitted according to the lighting mode, system controller 108 switches the lighting mode to emit light for reproducing the sunset sky is emitted. In addition, system controller 108 may automatically turns off each of lighting apparatuses 1 when a predetermined period of time passes. In this case, lighting changes at a predetermined time according to the timer function and the lighting mode, and thus it is possible to implement the lighting environment as if there is a window. Such settings may be performed using an operation component such as a remote control, which is not illustrated. It should be noted that terminal controller 111 and lighting controller 8 may have the timer function as described above.

Next, terminal controller 111 determines whether or not a setting complete operation has been performed (S11).

In the case where terminal controller 111 determines that the setting complete operation has not been performed (NO in S11), the operation returns to Step S11. In other words, terminal controller 111 sequentially determines whether or not the setting complete operation has been performed by a user until the user performs the setting complete operation via input interface 119. It should be noted that in the case where the setting complete operation is not performed on input interface 119, the operation may return to Step S1, or this flow of the operation may be ended.

In the case where terminal controller 111 determines that the setting complete operation has been performed (YES in S11), terminal controller 111 obtains sky information corresponding to each of lighting apparatuses 1 from outside via a network (S12). The sky information obtained by terminal controller 111 is determined based on information indicating, for example, an installation azimuth direction, an installation height, an installation location, a season, a set time, etc. In other words, terminal controller 111 assigns the sky information for each of lighting apparatuses 1, on the basis of the information inputted for each of lighting apparatuses 1.

Next, terminal controller 111 determines whether or not a transmitting switch is turned on (S13).

In the case where terminal controller 111 determines that the transmitting switch has not been turned on (NO in S13), the operation returns to Step S13. More specifically, terminal controller 111 sequentially determines whether or not a user has turned on the transmitting switch until the transmitting switch is turned on. It should be noted that in the case where an operation is not performed on input interface 119 for a predetermined period of time, the operation may return to Step S1, or this flow of the operation may be ended.

When the transmitting switch is turned on (YES in S13), terminal controller 111 transmits the sky information and the time information to the respective lighting apparatuses 1. Then, this flow is ended.

Figure 8:
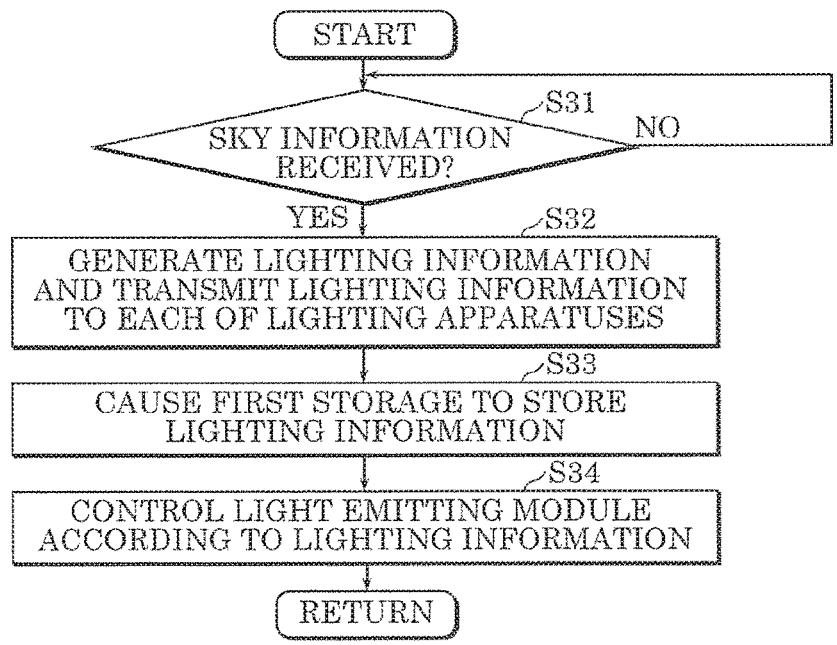
FIG. 8 is a flowchart which illustrates an operation of the light environment rendering system according to the embodiment.

The following describes, with reference to FIG. 8, a lighting operation of light environment rendering system 100, after the setting of light environment rendering system 100 illustrated in FIG. 6 and FIG. 7 has been performed.

FIG. 8 is a flowchart which illustrates an operation of the light environment rendering system according to the embodiment.

First, a user turns on the power supply of light environment rendering system 100 to start an operation of light environment rendering system 100.

Next, system controller 108 of light environment rendering system 100 determines whether or not sky information has been received via first communicator 15 (S31). In the case where system controller 108 determines that the sky information has not been received via first communicator 15 (NO in S31), the process of Step S31 is repeated. More specifically, system controller 108 is put into a wait state for receiving the sky information.

Here, in addition, system controller 108 also obtains time information. System controller 108 performs time settings such that time of terminal device 110 interlocks with first clock 12 of each of lighting apparatuses, based on time information. More specifically, system controller 108 sets a time of first clock 12 for synchronizing timing of turning on, turning off, etc. of each of lighting apparatuses 1, based on the time information. It should be noted that the time setting described above may be performed by lighting controller 8.

In the case where system controller 108 determines that sky information has been received via first communicator 15 (YES in S31), system controller 108 determines an illumination mode of lighting apparatus 1 based on the sky information, and generates lighting information on the basis of the illumination mode (S32). The generated lighting information is transmitted to lighting controller 8 of each of lighting apparatuses 1, by system controller 108 (S32).

Lighting controller 8 of each of lighting apparatuses 1 causes first storage 13 to store lighting information (S33).

Next, lighting controller 8 of each of lighting apparatuses 1 controls light emitting module 6 so as to cause light emitting module 6 to emit light according to the lighting information stored in first storage 13 (S34). Then, the operation illustrated in this flowchart returns to Step S1, and similar processes are repeatedly performed.

The lighting information of each of lighting apparatuses 1 is continuously or discretely updated by repeatedly performing the above-described operation, and thus it is possible to perform lighting according to the sky information that changes from moment to moment. It should be noted that, when a user turns off the power supply of system controller 108 during the operation illustrated in the flowchart, each of lighting apparatuses 1 is turned off.

With light environment rendering system 100 as described above, each of lighting apparatuses 1 performs lighting according to sky information, on the basis of the lighting information that has been set. More specifically, each of lighting apparatuses performs lighting simulating at least one of a brightness and a color tone of the sky which are determined by the height at which each of lighting apparatuses 1 is positioned, the azimuth direction of the sun, etc. In other words, with light environment rendering system 100 described above, terminal device 110 obtains sky information from CIE as if terminal device 110 cuts out part of a celestial sphere according to a preference of a user, and causes each of lighting apparatuses 1 to perform lighting that is determined on the basis of the sky information. For that reason, light environment rendering system 100 gives the user who views lighting apparatus 1 the illusion that the user is viewing the sky in an intended location through the window. It should be noted that the sky information may be calculated by terminal controller 111, using a predetermined calculation formula stored in advance in second storage 121, for example.

In addition, the actual sky has different blue gradations and different brightness levels with different directions. More specifically, the blue gradation is light on the south due to the influence of the sun, and the blue gradation gradually increases in the density from the south toward the north via the west or the east. In addition, on the west, the gradation gradually increases in the density from the west toward the east, when the sun is present. On the other hand, the gradation gradually increases in the density from the east toward the west, when the sun is present on the east.

In light environment rendering system 100 described above, lighting apparatuses 1 perform lighting differently according to the positions at which the respective lighting apparatuses 1 are located. Accordingly, it is possible to allow a user to have an image that windows are present on the south side, the north side, the west side, and the east side, by performing lighting suitable for the directions. For that reason, it is possible to allow the user to feel the sense of openness and thus be in a relaxed state.

Advantageous Effect

The following describes an advantageous effect of light environment rendering system 100, lighting apparatus 1, a light environment rendering method, and a storage medium according to the present embodiment.

As described above, light environment rendering system 100 according to the present embodiment includes: one lighting apparatus 1 (a first lighting apparatus) disposed on a part of a structure to form an illumination space; another lighting apparatus 1 (a second lighting apparatus) disposed on the part of a structure, at a position different from a position at which the one lighting apparatus is located, to form the illumination space; and system controller 108 which controls an operation of each of the lighting apparatuses 1. System controller 108 determines an illumination mode based on sky information that indicates at least one of a brightness and a color tone of a sky which are determined at least based on an azimuth direction and a height of the sun, and causes each of the lighting apparatuses 1 to perform lighting simulating a sky according to the illumination mode.

In this manner, system controller 108 determines the illumination mode on the basis of the sky information that indicates at least one of a brightness and a color tone of the sky which are determined based on at least: the azimuth direction; and the height of the sun. Then system controller 108 causes each of the plurality of lighting apparatuses 1 to perform lighting simulating the sky according to the illumination mode. For that reason, it is possible to provide a user who views lighting apparatus 1 with the illusion that the user is viewing the sky through the window.

Accordingly, with light environment rendering system 100 described above is capable of reproducing an artificial sky while suppressing an increase in size.

In addition, the light environment rendering method according to the present embodiment is used in disposing one of lighting apparatuses 1 on a part of a structure so as to form an illumination space, and disposing an other of lighting apparatuses 1 on the part of a structure to form the illumination space. The other of lighting apparatuses 1 is located at a position different from a position at which the one of lighting apparatuses 1 is located. In addition, terminal device 110 transmits the sky information that indicates at least one of a brightness and a color tone of the sky which are determined based on at least: the azimuth direction; and the height of the sun, to system controller 108. Then system controller 108 determines an illumination mode on the basis of sky information, and performs lighting simulating the sky according to the illumination mode.

In addition, a non-transitory computer readable storage medium according to the present embodiment stores thereon a program which causes a computer to implement the light environment rendering method.

The light environment rendering method and the storage medium also produce the advantageous effect similar to or same as the advantageous effect produced by light environment rendering system 100.

In addition, in light environment rendering system 100 according to the present embodiment, system controller 108 further determines, among the plurality of lighting apparatuses 1, one or more lighting apparatuses 1 positioned closer to the sun with respect to a selected one of the plurality of lighting apparatuses 1, based on at least: an installation azimuth direction; an installation height; and an installation location of each of the plurality of lighting apparatuses 1. Then, system controller 108 causes either one of: the one or more lighting apparatuses 1 determined to be positioned closer to the sun; and the other lighting apparatuses 1 among the plurality of lighting apparatuses 1 to emit light at a greater brightness than the others.

In this manner, the one or more lighting apparatuses 1 positioned close to the sun are caused to emit light at a greater brightness than the other lighting apparatuses 1 positioned less close to the sun, and thus it is possible to perform illumination rendering more naturally simulating the sky.

In addition, in light environment rendering system 100 according to the present embodiment, the part of a structure includes wall 101 and wall 102 different from wall 101. In addition, lighting apparatus 1 is disposed on wall 101. Furthermore, another lighting apparatus 1 is disposed on wall 102.

In this manner, the plurality of lighting apparatuses 1 disposed on wall 101 and wall 102 perform lighting differently according to the respective lighting information items, and thus it is possible to perform lighting according to the positions at which the respective lighting apparatuses 1 are installed, on the basis of the sky information by the respective lighting apparatuses 1. As a result, it is possible to perform illumination rendering more naturally simulating the sky.

In addition, in light environment rendering system 100 according to the present embodiment, system controller 108 updates sky information and changes the lighting performed by each of the plurality of lighting apparatuses 1 as time passes, on the basis of the updated sky information.

In this manner, since system controller 108 changes the lighting performed by each of the plurality of lighting apparatuses 1 as time passes, on the basis of the updated sky information, it is possible to reproduce the sky in nature as it is. For that reason, it is possible to perform illumination rendering more naturally simulating the sky.

In addition, light environment rendering system 100 according to the present embodiment further includes terminal device 110 which transmits sky information obtained from an external device, to system controller 108. In addition, light environment rendering system 100 according to the present embodiment may include first communicator 15 which receives the sky information from terminal device 110 and outputs the sky information to system controller 108.

According to this configuration, the sky information is obtained via first communicator 15, and thus it is possible to reproduce as time passes the sky in nature which changes from moment to moment.

In addition, in light environment rendering system 100 according to the present embodiment, terminal device 110 includes input interface 119 for inputting information which indicates at least: an installation azimuth direction; an installation height; and an installation location of each of the plurality of lighting apparatuses 1.

In this manner, by inputting information which indicates at least: an installation azimuth direction; an installation height; and an installation location of each of the plurality of lighting apparatuses 1, it is possible to assign lighting information based on the sky information according to each of the plurality of lighting apparatuses 1. Thus, it is possible for each of the plurality of lighting apparatuses 1 to perform lighting according to the azimuth direction of the sun relative to each of the plurality of lighting apparatuses 1 and the height of each of the plurality of lighting apparatuses 1.

In addition, in light environment rendering system 100 according to the present embodiment, each of the plurality of lighting apparatuses 1 includes diffuser plate 5 that is light transmissive, light source 61 which emits blue light onto diffuser plate 5, and lighting controller 8 which controls light source 61. Lighting controller 8 changes an output of the light emitted by light sources 61.

In this manner, lighting controller 8 changes an output of the light emitted by light sources 61. Accordingly, for example, it is possible to change the output of the light based on the illumination mode determined based on the sky information, for example. For that reason, it is possible to perform illumination rendering more naturally simulating the sky.

In addition, in light environment rendering system 100 according to the present embodiment, light sources 61 of each of one or more lighting apparatuses 1 and the other lighting apparatuses 1 among the plurality of lighting apparatuses 1 emits light having a color other than a color of the blue light, onto diffuser plate 5.

In addition, in light environment rendering system 100 according to the present embodiment, each of the one or more lighting apparatuses 1 and the other lighting apparatuses 1 among the plurality of lighting apparatuses 1 includes light source 61, reflector plate 4 which reflects light, and diffuser plate 5 which is light transmissive and disposed to face a front surface of reflector plate 4. The distance between diffuser plate 5 and reflector plate 4 is gradually decreases from one end of diffuser plate 5 to the other end of diffuser plate 5. Light source 61 is disposed on a side of the one end in such an orientation that light source 61 emits light toward reflector plate 4 and diffuser plate 5.

In addition, in light environment rendering system 100 according to the present embodiment, each of the one or more lighting apparatuses 1 and the other lighting apparatuses 1 among the plurality of lighting apparatuses 1 further includes frame 3 which has a plate shape, and includes opening portion 33 through which light that exits diffuser plate 5 passes.

In addition, in light environment rendering system 100 according to the present embodiment, frame 3 has an inner circumference surface which is black in color for suppressing reflection of light.

In addition, in light environment rendering system 100 according to the present embodiment, diffuser plate 5 causes Rayleigh scattering of at least light having a wavelength in a range from 435 nm or greater to 495 nm or less. In addition, in light environment rendering system 100 according to the present embodiment, diffuser plate 5 is oriented at an angle of 2 degrees or greater and 45 degrees or less with respect to reflector plate 4.

In addition, in light environment rendering system 100 according to the present embodiment, light source 61 is oriented to have optical axis J of light source 61 intersecting with one of diffuser plate 5 and reflector plate 4.

In addition, lighting apparatus 1 according to the present embodiment includes: casing 2 having a surface from which light exits: reflector 4 disposed on a back plate of casing 2 opposite to the surface; light source 61 disposed on a bottom plate of casing 2 between the back plate of casing 2 and the surface; and diffuser 5 disposed inside casing 2. Diffuser 5 is oriented at an angle of 2 degrees or greater and 45 degrees or less with respect to reflector plate 4. Light source 61 is located in a space formed by diffuser 5, reflector 4, and the bottom plate of casing 2. The bottom plate of casing 2 is a plate included in casing 2 and positioned on the Z-axis minus side of casing 2, and the back plate of casing 2 is a plate included in casing 2 and positioned on the Y-axis minus side of casing 2. An example of casing 2 includes a housing.

(Other Variations, etc.)

Although the light environment rendering system according to the present disclosure has been described on the basis of the embodiment, the present disclosure is not limited to the above-described embodiment.

For example, according to the foregoing embodiment, the sky information may be determined based on at least one of a brightness of the sky and a color tone of the sky which are determined by weather information, the azimuth direction of the sun, and the height of the sun.

In addition, according to the foregoing embodiment, the system controller may be operated in association with an existing lighting apparatus in a room. In this case, for example, control for increasing illuminance of the existing lighting apparatus disposed in a direction opposite to the estimated direction in which the sun is present may be performed. In this manner, it is possible to reproduce a scene in which light which enters a room through a window is reflected in the room, and increases a brightness on the side away from the window in the room, as in a general illumination space.

In addition, according to the foregoing embodiment, an illumination mode may be determined based on sky information by the terminal controller or the lighting controller instead of the system controller, and the terminal controller or the lighting controller may cause each of the plurality of lighting apparatuses to perform lighting simulating the sky based on the illumination mode. In the case where the illumination mode is determined by the terminal controller or the lighting controller, it is not necessary to include the lighting controller or the system controller. In this case, the terminal controller or the lighting controller is an example of a controller.

In addition, according to the foregoing embodiment, the first storage is provided to each of the lighting apparatuses. However, the system controller may include the first storage. In this case, the sky information may be stored in advance in the first storage. The system controller may obtain information which is inputted to the terminal device and indicates an azimuth direction, a height, a location, etc. of each of the lighting apparatuses, and may determine sky information based on the information and information indicating a user's desired location, a season, a time, etc. for implementing lighting.

In addition, according to the foregoing embodiment, although the terminal device obtains sky information, the sky information may be stored in advance in the second storage. The terminal controller may obtain information which is inputted to the terminal device and indicates an azimuth direction, a height, a location, etc. of each of the lighting apparatuses, and may determine sky information based on the information and information indicating a user's desired location, a season, a time, etc. for implementing lighting.

In addition, according to the foregoing embodiment, although the terminal device obtains identification information of each of the lighting apparatuses via a barcode reader, the method of obtaining the identification information is not limited to this example. For example, the identification information of each of the lighting apparatuses may be obtained through a network. The method of obtaining identification information of each of the lighting apparatuses is not specifically limited.

In addition, although the light environment rendering system has a rectangular shape in a plan view in the foregoing embodiment, the shape is not limited to the rectangular shape. For example, a multiangular shape such as a triangular shape, or a half-moon shape may be employed, or a combination of these shapes may be employed.

In addition, in the foregoing embodiment, a diffusion cover (straight-tube LED lamp) which covers the light source may be provided. In this case, comparing to the case where light is emitted from a plurality of LED chips which are simply arranged, luminance unevenness and color unevenness are not likely to occur on the diffuser plate that is in proximity to the light sources.

In addition, according to the foregoing embodiment, the light emitting module may be disposed for each of a blue light source, a white light source, and an orange light source. Alternatively, a blue light source, a white light source, and an orange light source may be alternately disposed in one light emitting module.

In addition, in the foregoing embodiment, a surface of the diffuser plate may be covered with an antireflection film for preventing reflection of light. Furthermore, the rear surface of the light transmissive plate may be covered with an antireflection film for preventing reflection of light. In this case, since the antireflection film covers the rear surface of the light transmissive plate, it is difficult for light which is incident on the rear surface of the light transmissive plate to be reflected and travel to the diffuser plate. In addition, since the antireflection film covers the front surface of the diffuser plate, it is difficult for light which is incident on the front surface of the diffuser plate to be reflected and exit through the light transmissive plate.

It should be noted that the present disclosure also includes other forms in which various modifications apparent to those skilled in the art are applied to the embodiment or forms in which structural components and functions in the embodiment are arbitrarily combined within the scope of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A light environment rendering system, comprising:
   a first lighting apparatus disposed on a part of a structure to form an illumination space;
   a second lighting apparatus disposed on the part of a structure to form the illumination space, the second lighting apparatus being located at a position different from a position at which the first lighting apparatus is located;
   a system controller which controls an operation of the first lighting apparatus and an operation of the second lighting apparatus; and
   a storage which stores sky information indicating at least one of a brightness and a color tone of a sky which are determined at least based on an azimuth direction and a height of the sun, wherein
   the system controller determines an illumination mode based on the sky information stored in the storage, and causes the first lighting apparatus and the second lighting apparatus to perform lighting, which simulates a sky indicated by the sky information, according to the illumination mode.

2. The light environment rendering system according to claim 1, wherein:
   the system controller further determines which one of the first lighting apparatus and the second lighting apparatus is positioned closer to the sun, based on at least: an installation azimuth direction; an installation height; and an installation location of each of the first lighting apparatus and the second lighting apparatus, and the system controller causes the one of the first lighting apparatus and the second lighting apparatus which is determined to be positioned closer to the sun to emit light at a brightness greater than a brightness of an other of the first lighting apparatus and the second lighting apparatus.

3. The light environment rendering system according to claim 1, wherein:

the part of a structure includes a first wall and a second wall different from the first wall, the first lighting apparatus is disposed on the first wall, and the second lighting apparatus is disposed on the second wall.

4. The light environment rendering system according to claim 1, wherein the system controller updates the sky information and changes the lighting performed by the first lighting apparatus and the lighting performed by the second lighting apparatus as time passes, based on the sky information updated.

5. The light environment rendering system according to claim 1, further comprising:

a terminal device which transmits the sky information obtained from an external device, to the system controller.

6. The light environment rendering system according to claim 5, wherein the terminal device includes an input interface via which information is inputted, the information indicating at least: an installation azimuth direction; an installation height; and an installation location of each of the first lighting apparatus and the second lighting apparatus.

7. The light environment rendering system according to claim 1, wherein the first lighting apparatus and the second lighting apparatus each include a diffuser plate that is light transmissive, a light source which emits blue light onto the diffuser plate, and a lighting controller which controls the light source, and the lighting controller changes an output of the light emitted by the light source.

8. The light environment rendering system according to claim 7, wherein the light source of each of the first lighting apparatus and the second lighting apparatus emits light having a color other than a color of the blue light, onto the diffuser plate.

9. The light environment rendering system according to claim 1, wherein the first lighting apparatus and the second lighting apparatus each include:

a light source;

a reflector plate which reflects light; and a diffuser plate which is light transmissive and disposed to face a front surface of the reflector plate, a distance between the diffuser plate and the reflector plate gradually decreases from one end of the diffuser plate toward an other end of the diffuser plate, and the light source is disposed on a side of the one end, and is oriented to emit light toward the diffuser plate and the reflector plate.

10. The light environment rendering system according to claim 9, wherein the first lighting apparatus and the second lighting apparatus each further include a frame which has a plate shape and includes an opening portion through which light exiting the diffuser plate passes.

11. The light environment rendering system according to claim 10, wherein the frame has an inner circumference surface which is black in color for suppressing reflection of light.

12. The light environment rendering system according to claim 9, wherein the diffuser plate causes Rayleigh scattering of at least light having a wavelength in a range from 435 nm or greater to 495 nm or less.

13. The light environment rendering system according to claim 9, wherein the diffuser plate is oriented at an angle of 2 degrees or greater and 45 degrees or less with respect to the reflector plate.

14. The light environment rendering system according to claim 9, wherein the light source is oriented to have an optical axis intersecting with one of the diffuser plate and the reflector plate.

15. A lighting apparatus, comprising:

a housing having a light exit surface from which light exits:

a reflector disposed on a back plate of the housing opposite to the light exit surface;

a light source disposed on a bottom plate of the housing between the back plate of the housing and the light exit surface;

a diffuser disposed inside the housing; and a storage which stores sky information indicating at least one of a brightness and a color tone of a sky which are determined at least based on an azimuth direction and a height of the sun, wherein:

the diffuser is oriented at an angle of 2 degrees or greater and 45 degrees or less with respect to the reflector plate, the light source is located in a space formed by the diffuser, the reflector and the bottom plate of the housing, and the lighting apparatus performs lighting, which simulates a sky indicated by the sky information stored in the storage.

16. A light environment rendering method which is used in a system including a first lighting apparatus disposed on a part of a structure to form an illumination space, a second lighting apparatus disposed on the part of a structure to form the illumination space and a storage which stores sky information indicating at least one of a brightness and a color tone of a sky which are determined at least based on an azimuth direction and a height of the sun, the second lighting apparatus being located at a position different from a position at which the first lighting apparatus is located, the light environment rendering method comprising:

transmitting, by a terminal device, sky information to a system controller, the sky information indicating at least one of a brightness and a color tone of a sky which are determined at least based on an azimuth direction and a height of the sun;

causing, by the system controller, the storage to store the sky information received; and determining, by the system controller, an illumination mode based on the sky information stored; and performing, by the system controller, lighting, which simulates a sky, based on the illumination mode.

17. A non-transitory computer readable storage medium storing a program,
  which causes a computer to implement the light environment rendering method according to claim 16, which comprises:
  transmitting, by the terminal device, the sky information to the system controller, the sky information indicating at least one of a brightness and a color tone of a sky which are determined at least based on an azimuth direction and a height of the sun; and
  determining, by the system controller, the illumination mode based on the sky information, and performing, by the system controller, lighting, which simulates a sky, based on the illumination mode.

\* \* \* \* \*